(12) United States Patent
Chen

(10) Patent No.: US 7,873,366 B2
(45) Date of Patent: Jan. 18, 2011

(54) METHOD FOR DISPLAYING LOCATION OF CELLULAR PHONE CALLER

(75) Inventor: James Chen, Hsinchu (TW)

(73) Assignee: Guan Technologies, LLC, Wilmington, DE (US)

( * ) Notice: Subject to any disclaimer, the term of this patent is extended or adjusted under 35 U.S.C. 154(b) by 1517 days.

(21) Appl. No.: 10/411,306

(22) Filed: Apr. 11, 2003

(65) Prior Publication Data

US 2004/0203924 A1    Oct. 14, 2004

(30) Foreign Application Priority Data

Dec. 13, 2002    (TW) .............................. 91136200 A

(51) Int. Cl.
*H04W 24/00*    (2009.01)
(52) U.S. Cl. .............. 455/456.1; 455/404.2; 455/412.1; 455/457; 379/201.1
(58) Field of Classification Search .............. 455/456.1, 455/456.4, 466, 412.1, 404.2, 457, 451.1, 455/456.3; 342/457; 379/142.6, 201.01, 379/201.02, 201.1, 221.13, 221.14; 709/206; 340/988
See application file for complete search history.

(56) References Cited

U.S. PATENT DOCUMENTS 6,101,393 A * 8/2000 Alperovich et al. ......... 455/466
6,477,363 B1 * 11/2002 Ayoub et al. ............. 455/404.2
7,020,267 B2 * 3/2006 Kryvossidis et al. ... 379/221.13
7,099,921 B1 * 8/2006 Engstrom et al. ........... 709/206
7,310,533 B2 * 12/2007 Galetti .................... 455/456.1
2003/0224811 A1 * 12/2003 Jain et al. .................. 455/466
2004/0203615 A1 * 10/2004 Qu et al. .................. 455/412.1

* cited by examiner

*Primary Examiner*—Md S Elahee
(74) *Attorney, Agent, or Firm*—Perkins Coie LLP

(57) ABSTRACT

The present invention relates to a method for displaying the location of a cellular phone caller. In the present method, a caller's cellular phone transmits a short message preset by a cellular base station to the base station through an Unstructured Supplementary Service Data (USSD) function by using a cellular phone and selects to start or stop a function for informing the location of a caller to a phone answerer. When a phone call is made and the location informing function is stopped, the base station transmits no caller location information to an answerer's cellular phone. If the location informing function is activated, the base station uses a positioning technology to calculate position coordinates of the caller. And then, the base station compares the position coordinates with a location data stored in a position coordinate data base of the base station and transforms the location to a closest address so as to display the caller's address in the answerer's phone by a Class 0 SMS (short message system).

11 Claims, 6 Drawing Sheets picture on the screen corresponding to Step S21

P21 picture on the screen corresponding to Step S23

P23 picture on the screen corresponding to Step S26

P26

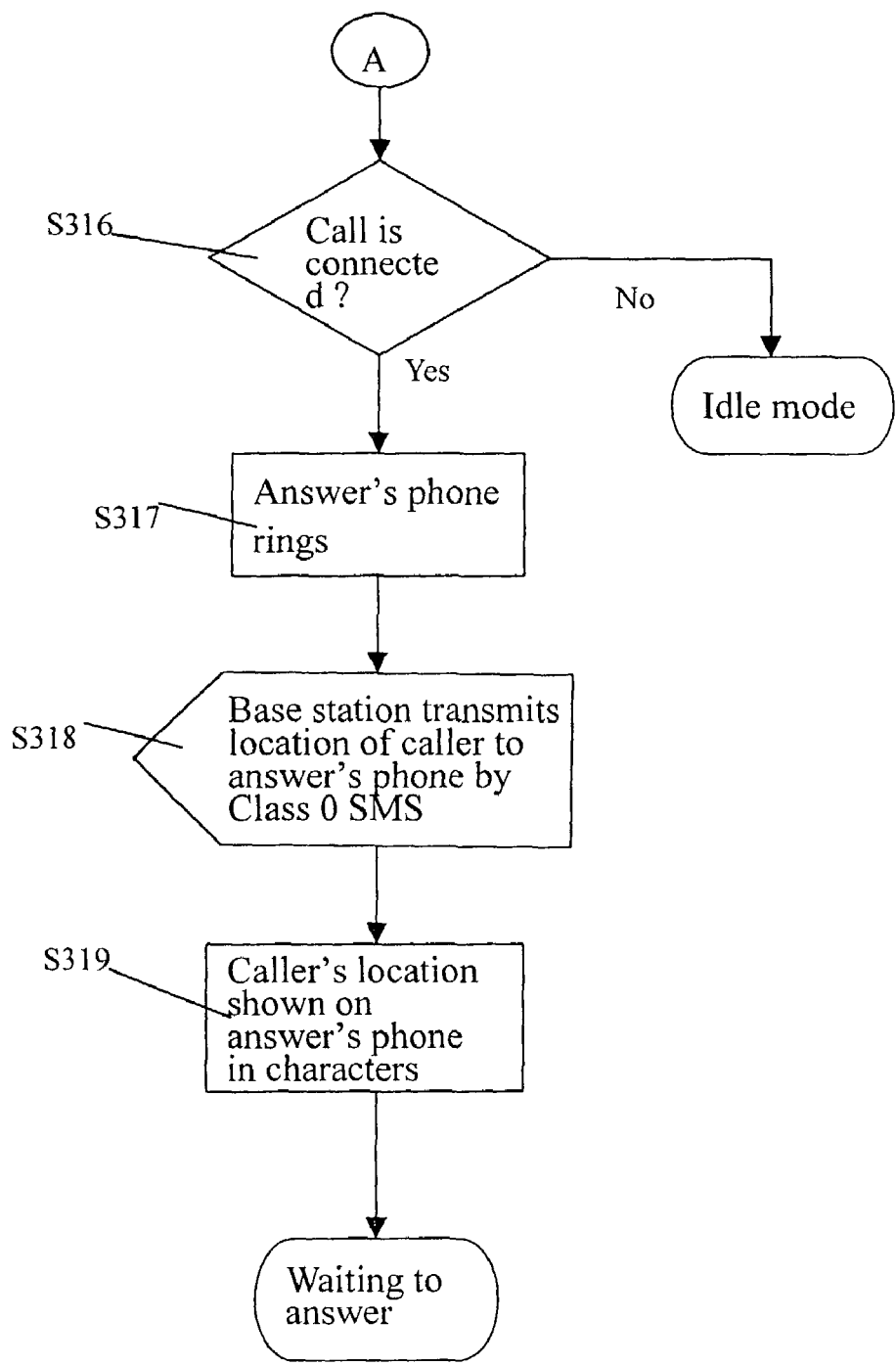
FIGURE 3A-Cont'd picture on the screen corresponding to Step S311 picture on the screen corresponding to Step S315 picture on the screen corresponding to Step S317 picture on the screen corresponding to Step S23

METHOD FOR DISPLAYING LOCATION OF CELLULAR PHONE CALLER

FIELD OF THE INVENTION

The present invention relates to a method for displaying the location of a cellular phone caller, particular to a method for displaying location of cellular phone caller by using an "Unstructured Supplementary Service Data" function in the GSM to display the caller's address in the answerer's phone by a Class 0 short message (SMS).

BACKGROUND OF THE INVENTION

Till now, cellular phone only display a caller's name and phone number on the display screen of a cellular phone. The location of a caller can not be known from the screen so that the requirement of tracking and safety cannot be attained.

SUMMARY OF THE INVENTION

The object of the present invention is to provide a method for displaying the location of a cellular phone caller, enabling the caller's positioned location to be transmitted to an answerer's cellular phone through a Class 0 short message (SMS) and to be displayed ton the display screen of the answerer's cellular phone in characters. Therefore, the method according to the present invention can be used to show a location of a caller on the display screen in addition to the caller's phone number. According to the method, a cellular phone user can use a cellular phone to transmit a short message preset by a cellular base station to the base station through an Unstructured Supplementary Service Data (USSD) function and selects to start or stop a function for informing the location of a caller to a phone answerer that the caller intends to make a phone call to.

The other object of the present invention is to provide a method for displaying location of cellular phone caller, which can inform the answerer of the location of a caller to attain a tracking and safety requirements.

The further object of the present invention is to provide a method for displaying location of cellular phone caller, which is suitable for any cellular phone having SMS function and unnecessary to cost more on developing a cellular phone with new functions.

These objects and the other objects, features, and advantages will be apparent to those people skilled in the art from the following detailed description in connection with the drawings.

DETAILED DESCRIPTION OF THE INVENTION

Figure 1:
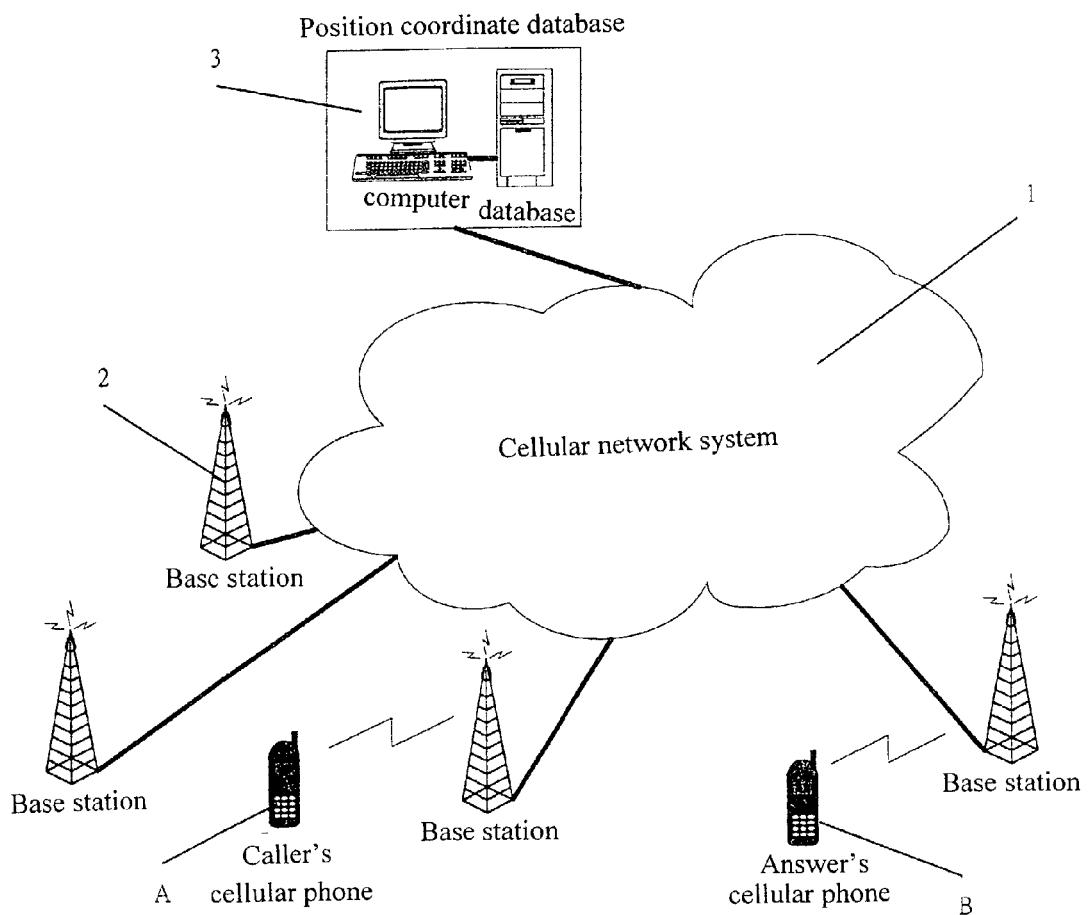
FIG. 1 shows a cellular network system structure having a positioning function and a position coordinate database according the present invention.
Figure 2A:
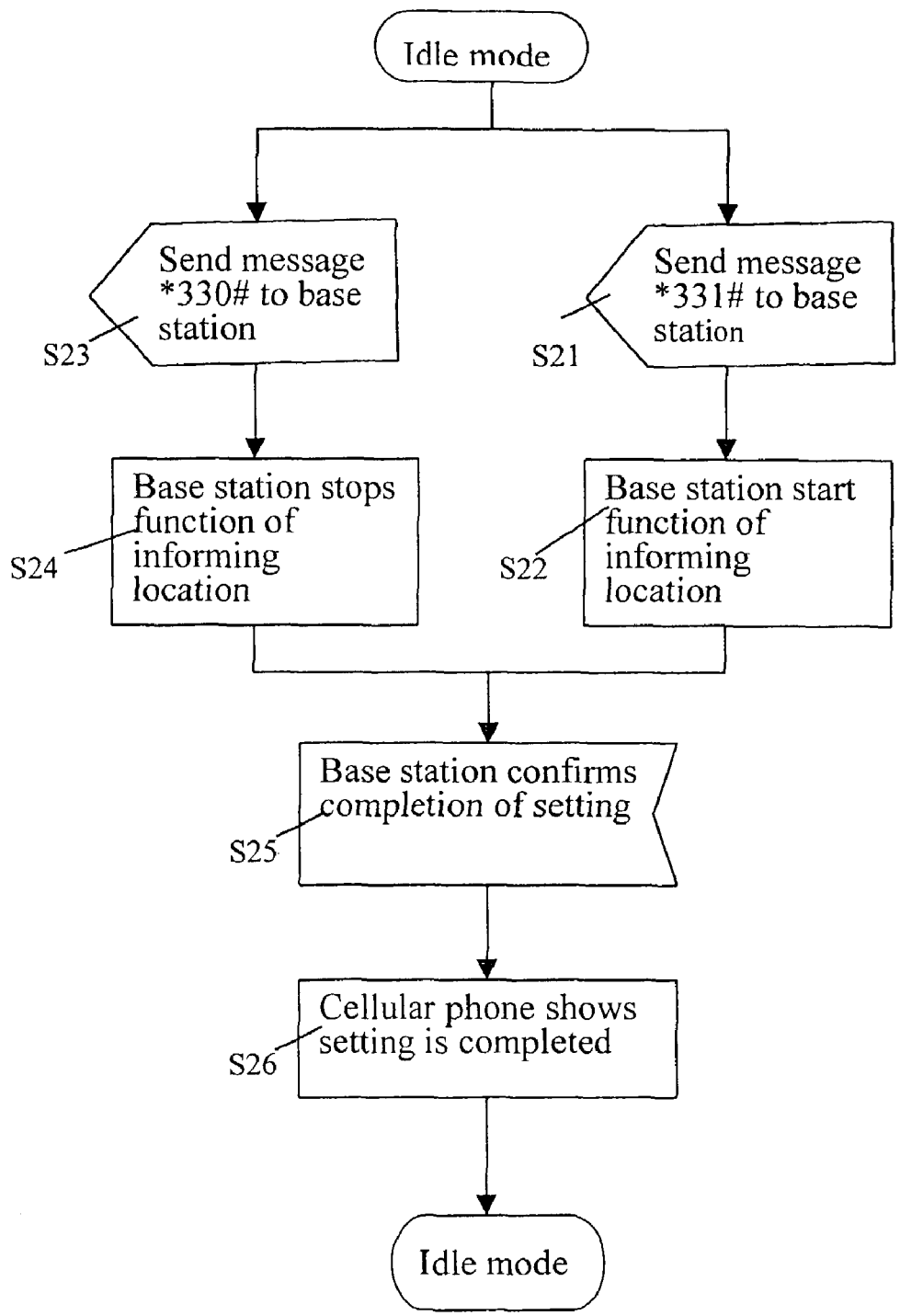
FIG. 2A is a flow chart showing procedures of a method for starting or stopping a function for informing the location of a caller to a phone answerer according to the present invention.
Figure 2B:
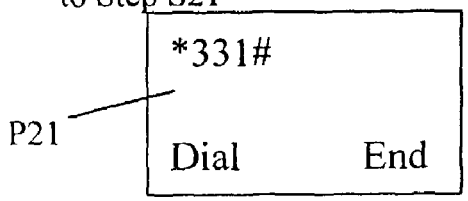
FIG. 2B shows pictures on the screen of a cellular phone corresponding to each step in FIG. 2A.
Figure 2B:
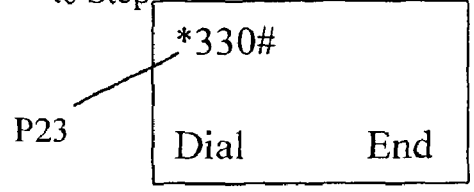
Figure 2B:
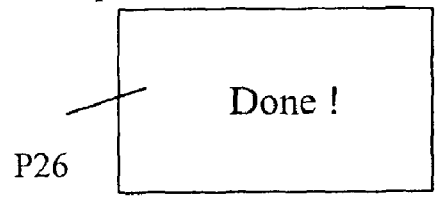

First of all, please refer to FIG. 1. FIG. 1 shows a cellular network system structure having a positioning function and a position coordinate database according to the present invention. From FIG. 1, when a cellular phone caller B makes a phone call to a cellular phone answerer A, the call goes to a cellular phone base station 2 via a cellular phone net 1 first. The base station 2 checks whether the cellular phone caller B has started the function for informing the location of a caller to a phone answerer. If so, the base station 2 starts to calculate position coordinates of the caller by using a positioning technology (for example, Global Positioning System (GPS), three points positioning technology or base station positioning technology, etc.). Then, the base station 2 compares the calculated position coordinates of the caller with a location data stored in a position coordinate database to determine the location on a map. Thereafter, the base station 2 sends a short message (SMS) indicating the location of a caller to the answerer's cellular phone. Next, please refer to FIG. 2A. FIG. 2A is a flow chart showing the procedures of the method for starting or stopping a function for informing the location of a caller to a phone answerer according to the present invention. A cellular phone user transmits a short message preset by a cellular base station to the base station to start or stop a function for informing the location of a caller to a phone answerer. (Herein presuming that a short message "*331#" means to start the function for informing the location of a caller, and a short message "*330#" means to stop the function for informing the location of a caller) According to the procedures, if a cellular phone user sends a short message "*331#" to the base station (Step S21, its corresponding picture on the screen is shown in FIG. 2B, P21), the base station starts the function for informing the location of a caller (Step S22). Conversely, if a cellular phone user sends a short message "*330#" to the base station (Step S23, its corresponding picture on the screen is shown in FIG. 2B, P23), the base station stops the function for informing the location of a caller (Step S24). In either case, the base station will inform the user of function setting completion (Step S25). At the same time, the cellular phone will show that the function setting is completed (Step S26, its corresponding picture on the screen is shown in FIG. 2B, P26).

Figure 3A:
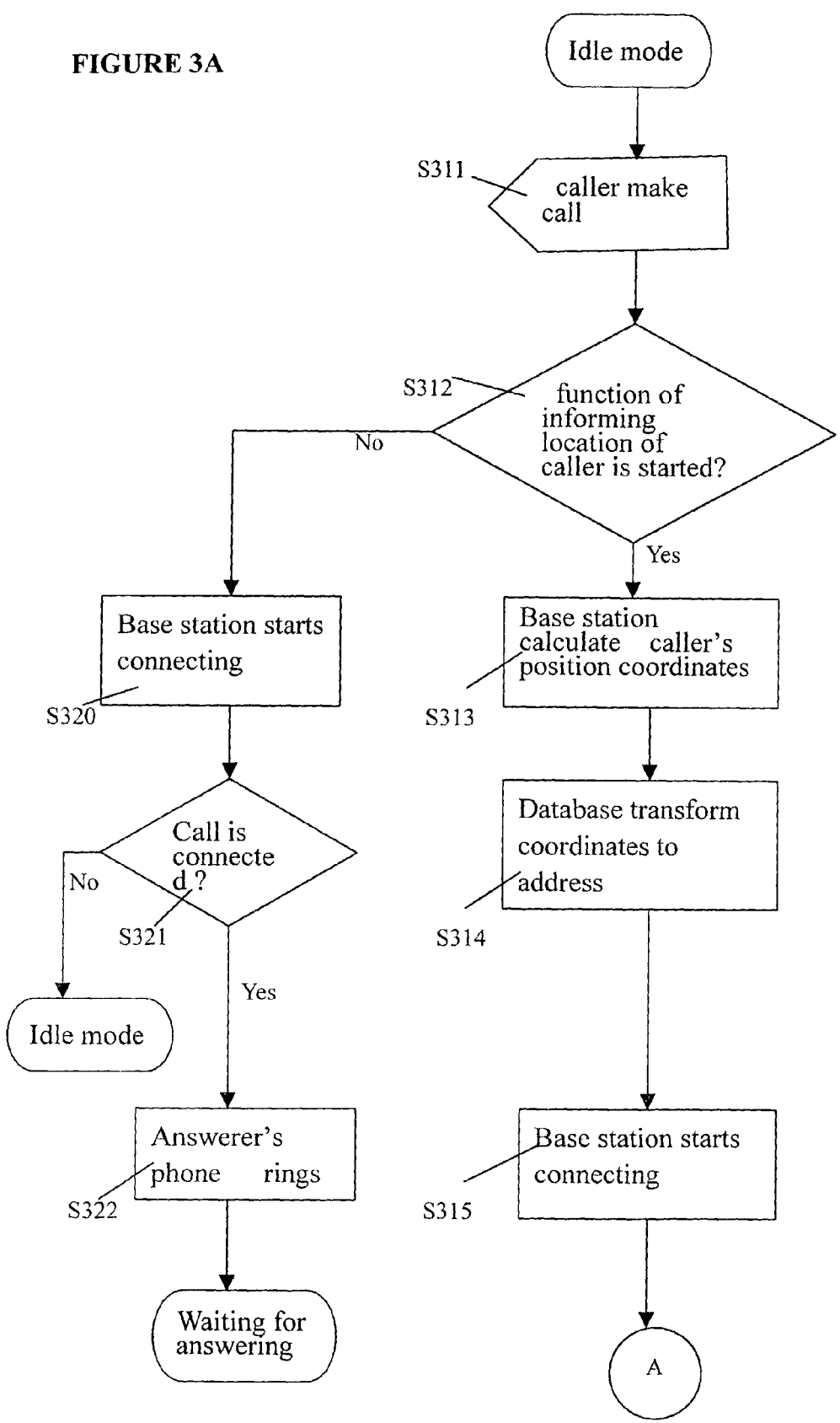
FIG. 3A is a flow chart showing procedures of a method for informing the location of a caller to a phone answerer according to the present invention.
Figure 3B:
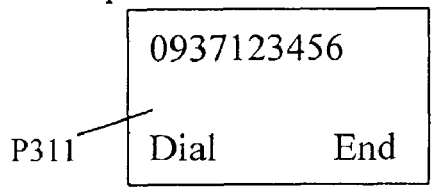
FIG. 3B shows pictures on the screen of a cellular phone corresponding to each step in FIG. 3A.
Figure 3B:
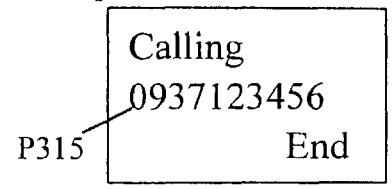
Figure 3B:
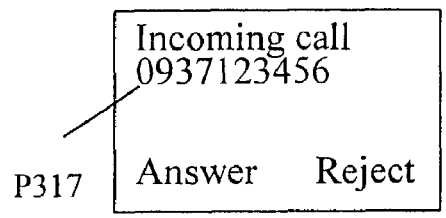
Figure 3B:
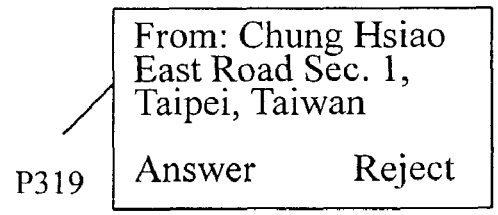

Finally, please refer to FIG. 3A. FIG. 3A is a flow chart showing the procedures of a method for informing the location of a caller to a phone answerer according to the present invention. First at all, the cellular phone B (a caller) is in an idle mode. At this time, a user makes a phone call from the cellular phone B to an answerer's cellular phone A (phone number 0937123456) (Step S311, its corresponding picture on the screen is shown in FIG. 3B, P311). The call is first sent to a cellular base station and the base station checks whether the cellular phone B has started the function for informing the location of a caller (Step S312). If yes, the base station searches a position of the cellular phone B and calculates the caller's position coordinates (Step S313). The position coordinate database stored in the base station transfers the position coordinates to an address (Step S314). Thereafter, the base station starts a call connection procedure (Step S315, its corresponding picture on the screen is shown in FIG. 3B, P315). Then, the base station checks whether the connection is completed (Step S316). If not, the cellular phone enters an idle mode. If yes, the answerer's cellular phone rings (Step S317, its corresponding picture on the screen is shown in FIG. 3B, P317). At this time, the answerer's cellular phone shows the name and phone number of the caller on the screen as a conventional cellular phone. Also, the base station sends the location of a caller to the answerer's cellular phone through a Class 0 short message system (Step S318). After receiving a SMS containing the location, the answerer's cellular phone displays the location in a character form on the screen thereof (Step S319, its corresponding picture on the screen is shown in FIG. 3B, P319). Then, the answerer's cellular phone is waiting for an answerer. After Step S312, if the base station checks out the cellular phone B has not started the function for informing the location of a caller (Step S320), the base station starts proceeding a conventional dialing. In this time, the base station checks whether the call is connected (Step S321). If not, the cellular phone enters an idle mode. If the call is connected, the answerer's cellular phone rings (Step S322, its corresponding picture on the screen is shown in FIG. 3B, P315) to mention an incoming phone call.

Although the present invention has been described by the above embodiment, the present invention is not limited by the embodiment. Person skilled in the art would make various changes or modification without departing from the spirit and the scope of the present invention. The present invention is only limited by the appended claims.

What is claimed is:

1. A method, comprising:
   detecting a phone call from a caller's cellular phone to an answerer's cellular phone;
   receiving a short message having an instruction from the caller's phone at a cellular base station through an Unstructured Supplementary Service Data (USSD) function, wherein the instruction is to (a) transmit a location of the caller's phone to the answerer's phone, or (b) not transmit the location of the caller's phone to the answerer's phone;
   if the instruction is to transmit the location of the caller's phone to the answerer's phone
      calculating position coordinates of the caller's phone using a positioning technology;
      comparing the position coordinates with location data stored in a position coordinates data base and transforming the position coordinates to an address; and
      connecting the phone call and transmitting a Class 0 SMS (short message system) to the answerer's cellular phone with the address of the caller's cellular phone during the phone call;
   if the instruction is to not transmit the location of the caller's phone to the answerer's phone, connecting the phone call.

2. The method of claim 1, further comprising sending a message to the caller's phone confirming that the instruction was received.

3. The method of claim 1, further comprising if the instruction is not to transmit the location of the caller's phone to the answerer's phone, transmitting a Class 0 SMS without the address of the caller's cellular phone.

4. The method of claim 1 wherein calculating position coordinates of the caller's phone includes calculating position coordinates with at least one of a Global Positioning System (GPS), three points positioning technology or base station positioning technology.

5. The method of claim 1 wherein connecting the call and transmitting the Class 0 SMS to the answerer's cellular phone occurs when a connection between the caller's phone and the answer's phone is complete.

6. The method of claim 1 wherein receiving the instruction comprises receiving a preset instruction separate from the phone call.

7. The method of claim 1, further comprising sending a confirmation of the instruction to the caller's cellular telephone.

8. A method, comprising:
   receiving a short message from a caller's phone to a cellular base station through an Unstructured Supplementary Service Data (USSD) function to either enable or disable a function for providing a location of the caller to the answerer;
   detecting a phone call from the caller's phone; and
   connecting the phone call and transmitting a Class 0 SMS (short message system) to an answerer's cellular phone during the phone call, wherein
      if the function for providing the location of the caller is disabled, the base station connects the phone call and transmits a Class 0 SMS to the answerer's cellular phone without an address of the caller's phone; and
      if the function for providing the location of the caller is enabled, (a) calculating the position coordinates of the caller's phone using positioning technology and (b) comparing the position coordinates with location data stored in a position coordinate data base of the base station and transforming the location to a caller's address, and wherein
      the base station connects the phone call and transmits a Class 0 SMS to the answerer's cellular phone that contains the caller's address.

9. The method of claim 8 wherein calculating the position coordinates of the caller's phone includes calculating the position coordinates with at least one of a Global Positioning System (GPS), three points positioning technology, or base station positioning technology.

10. The method of claim 8 wherein receiving the short message from a caller's phone comprises receiving a preset instruction separate from the phone call to either enable or disable a function for providing a location of the caller to the answerer.

11. The method of claim 8 wherein the base station transmits the class 0 SMS to the answerer's cellular phone once the phone call is connected.

* * * * *